US007662887B1

(12) United States Patent
Severt et al.

(10) Patent No.: US 7,662,887 B1
(45) Date of Patent: Feb. 16, 2010

(54) METHOD OF FORMING POLYALKENE SUBSTITUTED CARBOXYLIC ACID COMPOSITIONS

(75) Inventors: Richard Joseph Severt, North Plainfield, NJ (US); Antonio Gutierrez, Mercerville, NJ (US); Jacob Emert, Brooklyn, NY (US); Ramdas Venkatram, Edison, NJ (US); Jeremy Roger Spencer, Didcot (GB); Allison Joan Baker, Jersey City, NJ (US)

(73) Assignee: Infineum International Limited, Abingdon, Oxfordshire (GB)

( * ) Notice: Subject to any disclaimer, the term of this patent is extended or adjusted under 35 U.S.C. 154(b) by 0 days.

(21) Appl. No.: 12/242,971

(22) Filed: Oct. 1, 2008

(51) Int. Cl.
*C08F 289/00* (2006.01)
*C08F 8/00* (2006.01)
*C08F 8/46* (2006.01)

(52) U.S. Cl. .................. 525/245; 525/242; 525/244; 525/301; 525/302; 525/355; 525/357

(58) Field of Classification Search .............. 525/194, 525/195, 242, 245, 247, 301, 327.4, 327.8, 525/327.9, 244, 302, 355, 357
See application file for complete search history.

(56) References Cited

U.S. PATENT DOCUMENTS

| 3,215,707 | A |   | 11/1965 | Rense |        |
|-----------|---|---|---------|-----------------|--------|
| 3,219,666 | A |   | 11/1965 | Norman et al.   |        |
| 3,231,587 | A |   | 1/1966  | Rense           |        |
| 3,361,673 | A |   | 1/1968  | Stuart et al.   |        |
| 4,234,435 | A | * | 11/1980 | Meinhardt et al. | 508/192 |
| 4,943,671 | A |   | 7/1990  | Dockner et al.  |        |
| 5,489,390 | A |   | 2/1996  | Sivik et al.    |        |
| 5,672,266 | A |   | 9/1997  | Sivik et al.    |        |
| 5,885,944 | A |   | 3/1999  | Pudelski et al. |        |
| 6,077,909 | A |   | 6/2000  | Pudelski et al. |        |
| 6,562,904 | B2 |  | 5/2003  | Barini et al.   |        |
| 7,115,695 | B2 | * | 10/2006 | Okamoto et al.  | 528/14 |

* cited by examiner

*Primary Examiner*—Irina S Zemel
*Assistant Examiner*—Jeffrey Lenihan

(57) ABSTRACT

The residual chlorine content of a polyolefin-substituted carboxylic acylating agent formed by a halogen-assisted reaction of a polyalkene and at least one olefinic, monounsaturated mono- or dicarboxylic acid, anhydride or ester, is reduced when the reaction is conducted in the presence of a controlled amount of a metal compound.

31 Claims, No Drawings

METHOD OF FORMING POLYALKENE SUBSTITUTED CARBOXYLIC ACID COMPOSITIONS

FIELD OF THE INVENTION

The invention is directed to a method of forming polyalkene substituted carboxylic acid, anhydride or ester compositions having minimized residual halogen contents. More specifically, the invention is directed to a method of forming polyalkene substituted carboxylic acid, anhydride or ester compositions having minimized residual halogen contents, in which polyalkene is subjected to halogen-assisted reaction with at least one olefinic monounsaturated mono- or dicarboxylic acid, anhydride or ester, in the presence of a controlled amount of a metal compound.

BACKGROUND OF THE INVENTION

Compositions derived by reacting polyalkene-substituted carboxylic acid, anhydride or ester compositions with amines, alcohols and/or reactive metal compounds are known to be useful additives that provide fuel and lubricating oils with improved dispersing, detergent and/or viscometric properties. The polyalkene-substituted carboxylic acid, anhydride or ester compositions are themselves useful as emulsifiers. Such polyalkene-substituted carboxylic acid, anhydride or ester compositions are commonly formed by halogen-assisted reaction of polyalkene and at least one olefinic monounsaturated mono- or dicarboxylic acid, anhydride or ester, most commonly maleic anhydride. Chlorine is the most commonly used and effective halogen. In a two-step process, as described for example, in U.S. Pat. No. 3,219,666, a polyalkene is chlorinated until there is on average at least one chloro group for each polyalkene molecule. Chlorination can be achieved by simply contacting the polyalkene with chlorine gas until the desired amount of chlorine is incorporated into the polyalkene, usually at a temperature of about 75 to about 125° C. In the second step of the two-step chlorination process, the chlorinated polyalkene product of the first step is reacted with a molar equivalent, or a molar excess of $\alpha,\beta$-unsaturated carboxylic acid, anhydride or ester, usually at a temperature of about 100 to about 200° C. Alternatively, and as described for example by U.S. Pat. Nos. 3,215,707 and 3,231,587, a mixture of polyalkene and $\alpha,\beta$-unsaturated carboxylic acid, anhydride or ester reactants can, in a single step process, be contacted with chlorine gas (e.g., by passing chlorine gas through the mixture with agitation) at an elevated temperature (e.g., 140° C. or above).

Polyalkene-substituted carboxylic acid, anhydride or ester compositions synthesized via halogen (usually chlorine)-induced condensation of polyalkene and $\alpha,\beta$-unsaturated carboxylic acid, anhydride or ester compound conventionally contain a residual chlorine content of 0.5 to 1 mass %, which corresponds to 5,000 to 10,000 parts per million (ppm) of chlorine. Thus, additives derived from polyalkene-substituted carboxylic acid, anhydride or ester compounds (acylating agents) are a source of organochlorine in fuel and motor oils. Due to environmental concerns and regulations, it has become desirable to eliminate, or at least reduce, the level of chlorine and other halogens in fuel and motor oil additives and other industrial products. One way to address concerns regarding residual halogen is to avoid the use of halogen altogether by using a thermal process wherein a polyalkene and olefinic, monounsaturated mono- or dicarboxylic acid, anhydride or ester are heated together without halogen assistance, optionally in the presence of a catalyst (a "thermal" or "ene" reaction). Such a method is described, for example, in U.S. Pat. No. 3,361,673. However materials formed via the thermal route, in general, have a lower number of acylating groups per molecule. Another solution to the problem is to post-treat a halogen-containing product to remove halogen until the level of halogen in the product is at an acceptable level. Certain methods for accomplishing this are known. These methods, while capable of reducing the halogen content of the polyalkene substituted acylating agent, can also adversely reduce the number of acylating groups due to decarboxylation, manifested as a reduced saponification (SAP) number or level of active ingredient (AI), and can further increase the manufacturing time by requiring additional process steps (e.g., post-treatments or heat soaking).

U.S. Pat. No. 4,943,671 to Dockner et al, describes a reductive dehalogenation process for reducing the halogen content of an organic halogen compound with formation of a hydrogen halide in which the organic halogen compound is reacted with a hydrocarbon in the presence of elemental carbon at elevated temperature, in the presence of an iron powder or iron compound co-catalyst.

U.S. Pat. No. 5,489,390 to Sivik et al. describes a process for reducing the chlorine content of an organochlorine compound in which the organochlorine compound is mixed with (a) an acid selected from mineral acids other than HI and HBr, and organic acids having a pKa of less than about 2; and (b) a source of iodine or bromine, for a period of time sufficient to reduce the chlorine content of the compound. Chlorine levels in the compound may be reduced by treatment with iodine and bromine compounds. However, as a result, both halogens are present in the final product. Further, as would be apparent to one of ordinary skill in the art, the post treatment of dicarboxylic systems with mineral acids can lead to decarboxylation as well as the degradation of the polymer.

U.S. Pat. No. 5,672,266 to Sivik et al. discusses a process for reducing chlorine content by post thermal treatment, as in U.S. Pat. No. 5,489,390, using a relatively large amount of a Lewis acid, in the absence of elemental carbon. The Lewis acid is selected from salts of zinc, magnesium, calcium, iron, copper, boron, aluminum, tin, titanium and mixtures thereof, preferably in the presence of a source of iodine or bromine.

U.S. Pat. No. 5,885,944 to Pudelski et al. describes a method of reducing the chlorine content of polyalkylene-substituted carboxylic acylating agents which contain chlorine remaining from the chlorine induced condensation of polyalkenes and $\alpha$-, $\beta$-unsaturated carboxylic acid moieties by post treatment with elemental sulfur. The method disclosed results in the formation of hydrogen sulfide as a by-product and a sulfur-containing polyalkene-substituted carboxylic acylating agent having a relatively high kinematic viscosity.

U.S. Pat. No. 6,077,909 to Pudelski et al. describes a method of providing polyalkylene-substituted carboxylic acylating agents having a reduced chlorine content, which method relies on the use of, as the polyalkene reactant, a polyolefin having a total of tetra- and tri-substituted unsaturated end groups in an amount up to about 90 mole percent, wherein the polyolefin is reacted with halogen on a molar basis up to an amount equal to the moles of tetra- and tri-substituted end groups.

EP 0 684 262 describes a process for reducing the chlorine content of chlorinated polypropylene or polyisobutylene, or a mixture of polypropylene and polypropylene succinic anhydride, or polyisobutylene and polyisobutylene and polyisobutylene succinic anhydride, in which the polymer, or polymer and succinic anhydride mixture, is treated with heat for a specified period of time.

EP 0 665 242 describes a method for reducing the chlorine content of polyalkene substituted carboxylic acylating agents which involve treatment with a halogen other than chlorine (e.g., iodine or bromine).

U.S. Pat. No. 6,562,904 to Barini et al. describe a method for reducing the chlorine content of polyalkene substituted carboxylic acylating agents in which a maleated polyalkene having a residual chlorine content is heat-soaked in an additional amount of maleic anhydride, in the absence of further added chlorine.

SUMMARY OF THE INVENTION

In accordance with one aspect of the present invention, there is provided a method of forming polyalkene substituted carboxylic acid, anhydride or ester compositions having minimized residual halogen contents, in which polyalkene is subjected to halogen-assisted reaction with olefinic monounsaturated mono- or dicarboxylic acid, anhydride or ester, in the presence of a controlled amount of a metal salt, preferably a polyalkene-soluble metal compound.

In accordance with a second aspect of the invention, there is provided a method of forming polyalkene substituted carboxylic acid, anhydride or ester compositions having minimized halogen contents, as in the first aspect, in which the sediment and cycle time are concurrently minimized.

These and other objects, advantages and features of the present invention will be better understood from the following detailed description of the preferred embodiments.

DETAILED DESCRIPTION OF THE INVENTION

Suitable hydrocarbons or polymers employed in the method of this invention include homopolymers, interpolymers or lower molecular weight hydrocarbons. One family of such polymers comprises ethylene and/or at least one $C_3$ to $C_{28}$ alpha-olefin having the formula $H_2C=CHR^1$ wherein $R^1$ is straight or branched chain alkyl radical comprising 1 to 26 carbon atoms and wherein the polymer contains carbon-to-carbon unsaturation, preferably a high degree of terminal ethenylidene unsaturation. Such polymers may comprise interpolymers of ethylene and at least one alpha-olefin of the above formula, wherein $R^1$ is alkyl of from 1 to 18 carbon atoms, and more preferably is alkyl of from 1 to 8 carbon atoms, and more preferably still of from 1 to 2 carbon atoms. Therefore, useful alpha-olefin monomers and comonomers include, for example, propylene, butene-1, hexene-1, octene-1,4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers and the like, wherein the polymer contains at least some terminal and/or internal unsaturation. Preferred polymers are unsaturated copolymers of ethylene and propylene and ethylene and butene-1. The interpolymers of this invention may contain a minor amount, e.g. 0.5 to 5 mole % of a $C_4$ to $C_{18}$ non-conjugated diolefin comonomer. However, it is preferred that the polymers of this invention comprise only alpha-olefin homopolymers, interpolymers of alpha-olefin comonomers and interpolymers of ethylene and alpha-olefin comonomers. The molar ethylene content of the polymers employed in this invention is preferably in the range of 20 to 80%, and more preferably 30 to 70%. When propylene and/or butene-1 are employed as comonomer(s) with ethylene, the ethylene content of such copolymers is most preferably between 45 and 65%, although higher or lower ethylene contents may be present.

These polymers may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an aluminoxane compound. Using this process, a polymer in which 95% or more of the polymer chains possess terminal ethenylidene-type unsaturation can be provided. The percentage of polymer chains exhibiting terminal ethenylidene unsaturation may be determined by FTIR spectroscopic analysis, titration, or $C^{13}$ NMR. Interpolymers of this latter type may be characterized by the formula POLY-C($R^1$)=$CH_2$ wherein $R^1$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above. These terminally unsaturated interpolymers may be prepared by known metallocene chemistry and may also be prepared as described in U.S. Pat. Nos. 5,498,809; 5,663,130; 5,705,577; 5,814,715; 6,022,929 and 6,030,930.

Another useful class of polymers include is polymers prepared by cationic polymerization of isobutene, styrene, and the like. Common polymers from this class include polyisobutenes obtained by polymerization of $C_4$ refinery stream having a butene content of about 35 to about 75% by wt., and an isobutene content of about 30 to about 60% by wt., in the presence of a Lewis acid catalyst such as aluminum trichloride or boron trifluoride. A preferred source of monomer for making poly-n-butenes is petroleum feed streams such as Raffinate II. These feed stocks are disclosed in the art such as in U.S. Pat. No. 4,952,739. Polyisobutylene is a most preferred backbone of the present invention because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

Polyisobutylene polymers, when employed, are generally based on hydrocarbon chains having a number average molecular weight ($\overline{M}_n$) of from about 900 to about 2,300. Methods for making polyisobutylene are well known.

Preferred olefinic monounsaturated reactants used to functionalize the polyalkene backbone comprise mono- and dicarboxylic acid material, i.e., acid, anhydride, or acid ester material, including (i) monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxyl group, i.e., of the structure —C=C—CO—; and (iv) derivatives of (iii) such as $C_1$ to $C_5$ alcohol derived mono- or diesters of (iii). Mixtures of monounsaturated carboxylic materials (i)-(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid.

Exemplary of such olefinic, monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate. The olefinic monounsaturated carboxylic reactant, preferably maleic anhydride, typically will be used in an amount ranging from about 0.01 to about 20 wt. %, preferably 0.5 to 10 wt. %, based on the weight of polyalkene reactant.

The polyalkene may be functionalized with carboxylic acid producing moieties (preferably acid or anhydride) by reacting the polyalkene under conditions that result in the addition of functional moieties or agents (e.g., the acid, anhydride or ester moieties) onto the polyalkene chains, primarily at sites of carbon-to-carbon unsaturation (also referred to as ethylenic or olefinic unsaturation) using a halogen assisted functionalization process, in the presence of a polyalkene-soluble iron salt.

Processes for reacting polymeric hydrocarbons with olefinic mono- or dicarboxylic acid or anhydride or ester and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; and GB-A-1, 440,219. U.S. Pat. No. 4,234,435 describes a process for performing such a reaction whereby the resulting polyalkene-substituted carboxylic acylating agent will have, on average, at least 1.3 carboxylic groups per molecule. Because the carboxylic group "functionalizes" the molecule (provides a site for further reaction with, for example, an amine or hydroxyl group), such products can be described as having a "functionality" of at least 1.3. The degree of functionality can also be expressed as a saponification number. The saponification number indicates the milligrams of KOH needed to completely saponify one gram of polyalkene-substituted carboxylic acylating agent. Saponification can be defined as the reaction of an acid or anhydride with an alkali base to form a metal carboxylate of the acid, anhydride or ester. Functionality (F) may be expressed according to the following formula:

$$F=(SAP \times \overline{M}_n)/((112,200 \times A.I.)-(SAP \times MW))$$

wherein SAP is the saponification number (i.e., the number of milligrams of KOH consumed in the complete neutralization of the acid groups in one gram of the acyl group-containing reaction product, as determined according to ASTM D94); $\overline{M}_n$ is the number average molecular weight of the starting polyalkene; A.I. is the fraction of acyl group-containing composition in the reaction product (the remainder being unreacted polyalkene and saturates, unreacted acylating agent and diluent); and MW is the molecular weight of the acyl group (e.g., 98 for maleic anhydride). A reaction product of polyisobutene ($\overline{M}_n$ of 2225, A.I. of 0.86) and maleic anhydride in the presence of chlorine (PIBSA) having a functionality of 1.34 will have a saponification number of about 55. In contrast, such a reaction product having a functionality of 1.16 will have a saponification number of about 48, and such a reaction product having a functionality of 1.6 will have a saponification number of about 65.

Conventional polyisobutylene has about 4 to 5 mol. % vinylidene, 0-2 mol. % vinyl, 63-67 mol. % tri-substituted and about 20 to 30 mol. % tetra-substituted end groups. The vinylidene and vinyl double bonds do not readily add chlorine under the contemplated reaction conditions. The vinylidene and vinyl double bonds do not readily react with the chlorine under such reaction conditions. About 80 to 90 mol. % of the tri- and tetra-substituted unsaturated end groups react with chlorine during the acidification process to produce mostly short-lived intermediate chlorinated polyisobutene. As a result of random chlorination, residual chlorine can be found on the polymer at locations in which the maleic anhydride addition fails to eliminate the chlorine. As the reaction proceeds simultaneously with maleation, maleic anhydride mono-succinated polymer is first obtained, followed by bis-succination/chlorination on newly formed double bonds resulting from HCl elimination. Some polymer having remaining labile allylic chlorine from the tri-/tetra-substituted double bonds, some polymer with chlorine in the backbone, and some polymer containing unreacted double bonds is included in the resulting polyisobutene succinic anhydride (PIBSA) product.

Functionalization can be accomplished by halogenating, e.g., chlorinating or brominating the unsaturated polyalkene to about 1 to 8 wt. %, preferably 3 to 7 wt. % chlorine, or bromine, based on the weight of polyalkene, by passing the chlorine or bromine through the polyalkene at a temperature of 60 to 250° C., preferably 110 to 180° C., e.g., 120 to 140° C., for about 0.5 to 10, preferably 1 to 7 hours. In accordance with the present invention, the halogenated polyalkene (backbone) thus formed can be reacted, in the presence of the metal, with sufficient monounsaturated reactant capable of adding functional moieties to the backbone, e.g., monounsaturated carboxylic reactant, at a temperature of from about 100 to 250° C., such as from about 180° C. to 250° C., preferably from about 180° C. to 235° C., and for a time of about 0.5 to 10 hours (e.g., 3 to 8 hours), or until the product obtained contains the desired number of moles of the monounsaturated carboxylic reactant per mole of halogenated backbone.

Alternatively, and preferably, polyalkene and the olefinic, monounsaturated carboxylic reactant can be mixed and heated in the presence of the metal compound, while introducing halogen into the hot material. At least one metal salt is introduced into the reaction mixture prior to completion of the halogen-assisted functionalization reaction, such as prior to a time at which greater than about 85 mass %, such as greater than 80 mass %, preferably greater than about 70 mass %, such as greater than 50 mass %, more preferably about 25 mass %, of the polyalkene has been functionalized. More preferably, the metal salt is introduced prior to the initiation of the functionalization reaction. Most preferably, the metal compound is introduced into the reaction mixture concurrent with the polyalkene (e.g., is pre-mixed with the polyalkene).

Metal compounds useful in the practice of the present invention include compounds of magnesium (Mg), calcium (Ca), titanium (Ti), zirconium (Zr), hafnium (HO, chromium (Cr), molybdenum (Mo), manganese (Mn), iron (Fe), cobalt (Co), nickel (Ni), palladium (Pd), platinum (Pt), copper (Cu), zinc (Zn), aluminum (Al) and Tin (Sn). From a standpoint of performance, cost and toxicity (in handling), metal compounds of Fe, Cu, Co, Ni, Ti, Zn, Sn and Al are preferred. Most preferable are metal compounds of Fe, Ni, Cu and Co, particularly Fe.

Metal compounds useful in the practice of the present invention include metal chlorides, metal oxides, metal alkoxides and metal alkyl carboxylates. Preferable metal compounds are metal compounds that are soluble in the polyalkene, such as metal alkoxides and metal alkyl carboxylates.

Examples of useful metal compounds include Fe(neodecanoate)$_2$, Fe(III) oxide; Ni(II) 2-ethylhexanoate; Cu(II) 2-ethylhexanoate; cyclopentadienyl Co(I) dicarbonyl; bis (cyclopentadienyl)dimethyl Zr(IV); Cu(I) acetate; Fe Chloride (FeCl$_3$); Cr(II)-2-ethylhexanoate; Mn(II)-2-ethylhexanoate; Al chloride (AlCl$_3$); Al oxide, Zn acetate, Zn Stearate, Ti(IV) 2-ethyloxide and Sn acetate. Preferred are polyalkene-soluble compounds of Fe, Cu, and Co, most preferably, the metal compounds are polyalkene-soluble Fe compounds, such as Fe naphthanate, Fe(III) neo-decanoate, Fe(III) 2 ethyl hexanoate, Fe(III) acetyl acetonate, Fe(II) stearate, and Fe(III) 2,4 pentanedionate, particularly Fe(III) neo-decanoate.

The metal compounds are added in amounts introducing from about 0.01 to about 5.0 ppm, such as from about 0.1 to about 3.0 ppm, preferably from about 0.1 to about 2.0 ppm, such as from about 0.2 to about 1.0 ppm of elemental metal into the polyalkene. Introduction of the noted small amount of metal compound into the reaction concurrent with the polyalkene, or prior to substantial functionalization of the polyalkene, in a halogen-assisted reaction of polyalkene and olefinic, monounsaturated mono- or dicarboxylic acid, anhydride or ester results in the efficient, controlled release of halogen (chlorine) from the polyalkene backbone to provide polyalkene substituted carboxylic acid, anhydride or ester acylating agents having minimized residual halogen levels. In the presence of the metal, the halogen level is reduced without the need for long periods of nitrogen stripping, which, in a conventional process, is conducted for numerous hours at high temperature or other post-treatment of the halogen-containing polyalkene. Therefore, the cycle time of the reaction is reduced, as is the level of sediment in the product, which is a by-product of lengthy high temperature nitrogen stripping processes and certain post-treatment procedures for reducing residual chlorine, such as heat-soaking. The process of the present invention further requires a far smaller amount of metal compound to effect a reduction in halogen content compared to post-treatment methods using Lewis acids (e.g., 10 ppm to 2.5 mass %, as described in U.S. Pat. No. 5,489,390). Such large amounts of metal can contribute to depolymerization of the polyalkene backbone.

The preferred polyalkene reactant is polyisobutylene, more preferably polyisobutylene (PIB) having a number average molecular weight (Me) of 900 to 3000, such as 1500 to 3000. Further preferred as the polyalkene reactant is polyisobutylene having $\overline{M}_n$ of 900 to 3000 (preferably 1500 to 3000) and more preferred is polyisobutylene having $\overline{M}_n$ of 900 to 3000 (preferably 1500 to 3000), and greater than about 60%, more preferably greater than about 80%, tri- and tetra-substituted unsaturated end groups. Preferably, the polyalkene is derived from a C$_4$ petroleum feed stream containing from about 10 to about 75 mass %, preferably from about 15 to about 60 mass %, more preferably from about 20 to about 55 mass % of isobutene, based on the total mass of olefin. The preferred olefinic monounsaturated mono- or dicarboxylic acid, anhydride or ester is maleic anhydride (MA). Preferably, the MA and PIB are charged for reaction at a MA/PIB molar ratio of from about 0.9 to about 2.5, preferably from about 1.0 to about 2.0, more preferably from about 1.1 to about 1.8.

Preferably, the MA and PIB are reacted together (soak/strip) for from about 1 to about 15 hours, at a temperature of from about 100° C. to about 240° C., preferably from about 180° C. to about 240° C. Preferably, the halogen is chlorine and the chlorine is introduced in an amount providing a Cl$_2$/PIB molar ratio of from about 1.2 to about 3.5, preferably from about 1.4 to about 3.0, more preferably from about 1.6 to about 2.5. The method of the present invention allows for the use of higher Cl2/PIB ratios than conventional methods; in conventional methods the use of such high ratios is not possible due to the higher residual chlorine content of the resulting products. The reduction in the amount of sediment in products formed by the present method is especially apparent when the Cl$_2$/PIB ratio is increased.

Preferably from about 8 to about 35 mass % of the total mass of chlorine is introduced into the reaction mixture per hour. Preferably, the temperature is raised during the reaction and introduction of chlorine begins at a temperature of from about from about 100° C. to about 170° C., more preferably from about 120° C. to about 150° C., and ends at a temperature of from about 180 to 250° C., more preferably from about 180° C. to about 230° C. (e.g., 220° C.). Preferably, at least about 70 mass %, such as at least about 75 mass %, of the chlorine is added before the reaction temperature reaches 180° C. Preferably, the reaction product is polyisobutene succinic anhydride (PIBSA) having a functionality of from about 1.2 to about 1.7, preferably from about 1.3 to about 1.6.

Preferably, the polyalkene and olefinic monounsaturated mono- or di-carboxylic acid, anhydride or ester is reacted in the substantial absence of polyalkene-insoluble elemental metal and metal compounds (amounts introducing less than 5 ppm of elemental metal into the polyalkene).

Although the process of the present invention, in addition to minimizing halogen content, also minimizes sediment formation to a level at which filtration of the product and/or addition of sediment-reducing agents becomes unnecessary, the product may be treated with a sediment reducing agent to provide a product that is substantially free of sediment (less than 0.08 mass %, preferably below 0.03 mass %, such as from 0.01 to 0.03 mass % sediment).

Sediment reducing agents suitable for use include oil soluble strong organic acids, preferably oil soluble hydrocarbyl substituted sulfonic acids. An "oil soluble" hydrocarbyl-substituted sulfonic acid is one that is at least 50 mass % soluble in mineral oil at 20° C. The hydrocarbyl sulfonic acid may be a natural or synthetic sulfonic acid, such as a mahogany or petroleum alkyl sulfonic acid, an alkyl sulfonic acid or an alkaryl sulfonic acid, wherein the hydrocarbyl substituent (i.e., petroleum alkyl, linear and/or branched chain alkyl, alkaryl, and the like) imparts the oil solubility. Oil-soluble mahogany acids may be obtained by treating lubricating oil basestocks with concentrated or fuming sulfuric acid.

The hydrocarbyl substituent of the sulfonic acid can contain non-hydrocarbon groups such as nitro, amino, halo (e.g., chloro or bromo), lower alkoxyl, lower alkyl mercapto, oxo (═O), thio (═S), imino (—NH—), ether (—O—), and thioether (—S—), provided the essentially hydrocarbon character of the substituent is retained for the purposes of this invention. When such non-hydrocarbon groups are present, they will generally represent no more than about 10 mass % of the total weight of the atoms in the hydrocarbyl substituent.

The preferred hydrocarbyl substituent is alkaryl, and the preferred sulfonic acids are accordingly alkaryl sulfonic acids. Alkaryl sulfonic acids can be obtained by sulfonating alkyl substituted aromatic hydrocarbons such as those obtained from the fractionation of petroleum by distillation and/or extraction, or by the alkylation of aromatic hydrocarbons as, for example, those obtained by alkylating benzene, toluene, xylene, naphthalene, and biphenyl. Preferred alkaryl sulfonic acids include those obtained by the sulfonation of hydrocarbons prepared by the alkylation of benzene or toluene with tri-, tetra- or pentapropene fractions resulting from propene polymerization.

The alkaryl sulfonic acids typically contain from 15 to 76, preferably from 24 to 40, and more preferably from 28 to 36 total carbon atoms. The aryl moiety can be derived from any aromatic hydrocarbon such as benzene, naphthalene, anthracene, biphenyl, and the like, but is preferably derived from benzene or naphthalene, and is most preferably derived from benzene. The preferred alkyl benzenesulfonic acids typically contain from 9 to 70, preferably from 18 to 34, more preferably from 22 to 30 total carbon atoms in the alkyl substituent (or substituents) in the aryl moiety. Particularly preferred is an alkylated benzenesulfonic acid having a $\overline{M}_n$ of from 475 to 600 and an average of 2 alkyl groups wherein each of the alkyl groups contains an average of 11 to 15 carbon atoms.

The alkylated benzene used for preparing the sulfonic acid is obtained by known alkylation processes; e.g., the benzene can be reacted with a suitable alkene or oligomer or polymer thereof in the presence of boron trifluoride. Among the $C_9$ to $C_{70}$ alkylated benzenes which are preferably employed in the preparation of the sulfonic acid are nonylbenzene, dodecylbenzene, waxy alkylated benzenes, and benzenes alkylated with suitable branched chain polymers of up to 70 carbon atoms obtained from propene, butene, amylene or mixtures thereof or the like. Preferably, nonyl or dodecyl or either of their equivalents in a mixture of alkyls is employed in the preparation of the sulfonic acid.

The hydrocarbyl-substituted sulfonic acid is used in an amount effective for preventing or substantially reducing the formation of sediments for the selected reaction time and conditions. When used, the amount of sulfonic acid employed in the present invention is typically in the range of from about 0.05 to 1.0 mass %, preferably 0.15 to 0.5 mass % based on the total weight of the polyalkene and the dicarboxylic reactants.

To provide a dispersant suitable for use in fuels and lubricants, the polyalkene-substituted carboxylic acylating agent, as described supra, may then be further derivatized with a nucleophilic reactant, such as an amine, amino-alcohol, alcohol, metal compound, or mixture thereof, to form a corresponding derivative. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxyl groups, alkoxyl groups, amide groups, nitriles, imidazoline groups, and the like. Particularly useful amine compounds include mono- and polyamines, e.g., polyalkene and polyoxyalkylene polyamines of about 2 to 60, such as 2 to 40 (e.g., 3 to 20) total carbon atoms having about 1 to 12, such as 3 to 12, and preferably 3 to 9 nitrogen atoms per molecule. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine and polypropyleneamines such as 1,2-propylene diamine; and di-(1,2-propylene)triamine.

Other useful amine compounds include: alicyclic diamines such as 1,4-di(aminomethyl)cyclohexane and heterocyclic nitrogen compounds such as imidazolines and alkylamine-substituted triazines, such as 2,4,6-trihexamethylenediamine triazine (TAHM) as described in U.S. Pat. No. 6,284,717. Another useful class of amines is the polyamido and related amido-amines as disclosed in U.S. Pat. Nos. 4,857,217; 4,956,107; 4,963,275; and 5,229,022. Also usable is tris(hydroxymethyl)amino methane (THAM) as described in U.S. Pat. Nos. 4,102,798; 4,113,639; 4,116,876; and UK 989,409. Dendrimers, star-like amines, and comb-structured amines may also be used. Similarly, one may use condensed amines, as described in U.S. Pat. No. 5,053,152 or "heavy polyamines", as described, for example, in any one of U.S. Pat. No. 5,565,128; 5,756,431; 5,792,730; or 5,854,186. The polyolefin-substituted carboxylic acylating agent can be reacted with the amine compound using conventional techniques as described, for example, in U.S. Pat. Nos. 4,234,435 and 5,229,022, as well as in EP-A-208,560.

The polyalkene-substituted carboxylic acylating agent may also be derivatized with hydroxyl compounds such as monohydric and polyhydric alcohols, or with aromatic compounds such as phenols and naphthols. Preferred polyhydric alcohols include alkylene glycols in which the alkylene radical contains from 2 to 8 carbon atoms. Other useful polyhydric alcohols include glycerol, mono-oleate of glycerol, monostearate of glycerol, monomethyl ether of glycerol, pentaerythritol, dipentaerythritol, and mixtures thereof. An ester dispersant may also be derived from an unsaturated alcohol, such as allyl alcohol, cinnamyl alcohol, propargyl alcohol, 1-cyclohexane-3-ol, and oleyl alcohol. Still other classes of alcohols capable of yielding ashless dispersants comprise ether-alcohols, including oxy-alkylene and oxy-arylene. Such ether-alcohols are exemplified by ether-alcohols having up to 150 oxy-alkylene radicals wherein the alkylene radical contains from 1 to 8 carbon atoms. The ester dispersants may be di-esters of succinic acids or acid-esters, i.e., partially esterified succinic acids, as well as partially esterified polyhydric alcohols or phenols, i.e., esters having free alcohol or phenolic hydroxyl radicals. An ester dispersant may be prepared by any one of several known methods as described, for example, in U.S. Pat. No. 3,381,022.

Particularly preferred ashless dispersants are those derived from polyisobutylene substituted with succinic anhydride groups and reacted with polyethylene amines, e.g., polyethylene diamine, tetraethylene pentamine; or a polyoxyalkylene polyamine, e.g., polyoxypropylene diamine, trimethylolaminomethane; a hydroxyl compound, e.g., pentaerythritol; and combinations thereof. One particularly preferred dispersant combination is a combination of (A) polyisobutylene substituted with succinic anhydride groups and reacted with (B) a hydroxy compound, e.g., pentaerythritol; (C) a polyoxyalkylene polyamine, e.g., polyoxypropylene diamine, or (D) a polyalkylene diamine, e.g., polyethylene diamine and tetraethylene pentamine using about 0.3 to about 2 moles of (B), (C) and/or (D) per mole of (A). Another preferred dispersant combination comprises a combination of (A) polyisobutenyl succinic anhydride with (B) a polyalkylene polyamine, e.g., tetraethylene pentamine, and (C) a polyhydric alcohol or polyhydroxy-substituted aliphatic primary amine, e.g., pentaerythritol or trismethylolaminomethane, as described in U.S. Pat. No. 3,632,511.

Such ashless dispersants can be further post treated by a variety of conventional post treatments such as boration, as generally taught in U.S. Pat. Nos. 3,087,936 and 3,254,025. Boration of the dispersant is readily accomplished by treating an acyl nitrogen-containing dispersant with a boron compound such as boron oxide, boron halide, boron acids, and esters of boron acids, in an amount sufficient to provide from about 0.1 to about 20 atomic proportions of boron for each mole of acylated nitrogen composition. Useful dispersants contain from about 0.05 to about 2.0 mass %, e.g., from about 0.05 to about 0.7 mass % boron. The boron, which appears in the product as dehydrated boric acid polymers (primarily $(HBO_2)_3$), is believed to attach to the dispersant bis-imides and diimides as amine salts, e.g., the metaborate salt of the diimide. Boration can be carried out by adding from about 0.5 to 4 mass %, e.g., from about 1 to about 3 mass % (based on the weight of acyl nitrogen compound) of a boron compound, preferably boric acid, usually as a slurry, to the acyl nitrogen compound and heating with stirring at from about 135° C. to about 190° C., e.g., 140° C. to 170° C., for from about 1 to about 5 hours, followed by nitrogen stripping. Alternatively, the boron treatment can be conducted by adding boric acid to a hot reaction mixture of the dicarboxylic acid material and amine, while removing water. Other post reaction processes known in the art can also be applied.

EXAMPLES

Example 1

To demonstrate the effects of the inventive method, a series of polyisobutylene succinic anhydride (PIBSA) products having various functionalities/SAP Nos, were formed by reacting 2225 $\overline{M}_n$ polyisobutylene (NB) and maleic anhydride (MA) in a simultaneous chlorination/maleation reaction under the following conditions in both the presence and absence of the specified amount of a polyisobutylene-soluble iron salt (Iron (III) Neo-Decanoate in Isopar-L solvent; the concentration of Fe in the solution being 6 mass %). The SAP No., chlorine content and sediment content of the resulting PIBSA products were then measured and compared. The results are shown below, in Table 1:

chlorine content of the product formed in the absence of the metal, the cycle time is increased, and far more sediment is formed, and the reduction in chlorine content is marginal. As shown by a comparison between comparative Example 7 and inventive Example 8, the presence of the metal compound allows for an 8 hour reduction in batch cycle time, while achieving a comparable chlorine content and a reduced level of sediment.

Example 2

To demonstrate the adverse impact of higher levels of metal on the formation of PIBSA products, PIBSA products having the functionalities/SAP Nos. shown were formed by reacting 2225 $\overline{M}_n$ polyisobutylene (PIB) and maleic anhydride (MA) in a simultaneous chlorination/maleation reaction under the following conditions in (i) the absence of a polyisobutylene-soluble iron salt (Iron (III) Neo-Decanoate) and (ii) in the presence of an amount of the polyisobutylene-soluble iron salt providing greater than 2 ppm of iron (ppm of mass in PI13). The SAP No., level of active ingredient (AI), chlorine content and sediment content of the resulting PIBSA products were then measured and compared. The results are shown below, in Table 2:

TABLE 1

| | Sample # | | | | | | | | | |
|---|---|---|---|---|---|---|---|---|---|---|
| | 1 | 2 | 3 | 4 | 5 | 6 | 7 | 8 | 9 | 10 |
| Inventive/Comparative | Comp | Inv | Comp | Inv | Comp | Inv | Comp | Inv | Comp | Inv |
| Fe Species Added | No | Yes | No | Yes | No | Yes | No | Yes | No | Yes |
| Fe Conc. (mppm in PIB) | — | 0.50 | — | 0.50 | — | 0.50 | — | 0.35 | — | 0.50 |
| MA/PIB Charge Ratio (m/m) | 0.055 | 0.055 | 0.055 | 0.055 | 0.055 | 0.055 | 0.057 | 0.057 | 0.063 | 0.063 |
| Cl$_2$/PIB Charge Ratio (m/m) | 0.055 | 0.055 | 0.058 | 0.058 | 0.054 | 0.054 | 0.054 | 0.057 | 0.065 | 0.065 |
| Cl$_2$ Addition Time (hrs) | 5 | 5 | 4 | 5 | 5.5 | 5.5 | 6.0 | 6.0 | 5 | 5 |
| Cl$_2$ Addition Temp. (° C.) | 140-205 | 140-205 | 140-225 | 140-225 | 140-215 | 140-220 | 140-195 | 140-200 | 140-220 | 140-220 |
| Soak Conditions (hrs@° C.) | 2@225 | 2@225 | 2@225 | 2@225 | 2@220 | 2@220 | 2@220 | 2@220 | 2@225 | 2@225 |
| N$_2$ Strip Conditions (hrs@° C.) | 2@225 | 2@225 | ½@225 | ½@225 | 1@220 | 1@220 | 8¾@220 | 1@220 | 1@225 | 1@225 |
| Batch Cycle Time (hrs) | 11.5 | 10.5 | 8.5 | 9.5 | 12.3 | 11.5 | 20.0 | 12.0 | 10.5 | 10.5 |
| PIBSA Quality | | | | | | | | | | |
| SAP No. (mg KOH/mg) | 55.2 | 52.7 | 56.1 | 53.9 | 52.0 | 54.4 | 55.2 | 54.3 | 64.0 | 63.0 |
| Cl Content (mass %) | 0.177 | 0.106 | 0.251 | 0.116 | 0.270 | 0.140 | 0.238 | 0.21 | 0.238 | 0.134 |
| Sediment Content (vol %) | 0.01 | 0.01 | 0.01 | 0.01 | 0.01 | 0.01 | 0.03 | 0.02 | 0.01 | 0.01 |

As shown by a comparison between comparative Examples 1, 3, 5 and 9, and inventive Examples 2, 4, 6 and 10, respectively, at constant nitrogen stripping times/temperatures, the presence of the defined small amount of metal compound during the chlorine assisted maleation process led to a product having reduced residual chlorine contents. As shown by a comparison between comparative Examples 5 and 7, when further nitrogen stripping is used to reduce the

TABLE 2

| Sample # | 11 | 12 |
|---|---|---|
| Inventive/Comparative | Comp | Comp |
| Fe Species Added | No | Yes |
| Fe Conc. (mppm in PIB) | — | 3.0 |
| MA/PIB Charge Ratio (m/m) | 0.065 | 0.065 |

TABLE 2-continued

| Sample # | 11 | 12 |
|---|---|---|
| Cl₂/PIB Charge Ratio (m/m) | 0.055 | 0.055 |
| Cl₂ Addition Time (hrs) | 5 | 5 |
| Cl₂ Addition Temp. (° C.) | 140-225 | 140-225 |
| Soak Conditions (hrs @ ° C.) | 2@225 | 2@225 |
| N₂ Strip Conditions (hrs @ ° C.) | 1@225 | 1@225 |
| Batch Cycle Time (hrs) | 10 | 10 |
| PIBSA Quality | | |
| SAP No. (mg KOH/mg) | 56.9 | 54.9 |
| Cl Content (mass %) | 0.088 | 0.064 |
| Sediment Content (vol %) | 0.01 | 0.03 |

As shown by the comparisons of Table 2, the presence of greater amounts of the polyalkene-soluble iron compound during the chlorine assisted maleation process led to an increase in sediment, which is indicative of backbone depolymerization.

Example 3

To demonstrate the effects of the inventive method using other polyisobutylene-soluble metal salts, polyisobutylene succinic anhydride (PIBSA) products were formed by reacting 2225 $\overline{M}_n$ polyisobutylene (PIB) and maleic anhydride (MA) using the charge ratios (of reactants) shown, in a simultaneous chlorination/maleation reaction under the following conditions in both the presence and absence of the specified amount of polyisobutylene-soluble nickel and copper salts (Ni(II)-2-ethylhexanoate and Cu(II)-2-ethylhexanoate). The SAP No., chlorine content and sediment content of the resulting PIBSA products were then measured and compared. The results are shown below, in Table 3:

TABLE 3

| Sample # | 13 | 14 | 15 | 16 | 17 |
|---|---|---|---|---|---|
| Inventive/Comparative | Comp | Inv | Inv | Inv | Inv |
| Metal Species Added | No | Yes | Yes | Yes | Yes |
| Metal Species | — | Ni | Ni | Cu | Cu |
| Metal Conc. (mppm in PIB) | — | 0.50 | 2.00 | 0.50 | 2.00 |
| MA/PIB Charge Ratio (m/m) | 0.065 | 0.065 | 0.065 | 0.065 | 0.065 |
| Cl₂/PIB Charge Ratio (m/m) | 0.058 | 0.058 | 0.058 | 0.058 | 0.058 |
| Cl₂ Addition Time (hrs) | 5 | 5 | 5 | 5 | 5 |
| Cl₂ Addition Temp. (° C.) | 140-220 | 140-220 | 140-220 | 140-220 | 140-220 |
| Soak Conditions (hrs @ ° C.) | 2@220 | 2@220 | 2@220 | 2@220 | 2@220 |
| N₂ Strip Conditions (hrs @ ° C.) | 1@220 | 1@220 | 1@220 | 1@220 | 1@220 |
| Batch Cycle Time (hrs) | 9.5 | 9.5 | 9.5 | 9.5 | 9.5 |
| PIBSA Quality | | | | | |
| SAP No. (mg KOH/mg) | 58.0 | 57.6 | 58.9 | 56.5 | 55.9 |
| Cl Content (mass %) | 0.117 | 0.105 | 0.106 | 0.104 | 0.102 |
| Sediment Content (vol %) | 0.01 | 0.01 | 0.01 | 0.01 | 0.01 |

As shown by a comparison between comparative Example 13, and inventive Examples 14 through 17, at constant nitrogen stripping times/temperatures, the presence of the defined small amount of nickel or copper compound during the chlorine assisted maleation process led to a product having reduced residual chlorine contents, with no increase in sediment.

The disclosures of all patents, articles and other materials described herein are hereby incorporated into this specification by reference, in their entirety. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed:

1. A method for providing a polyalkene-substituted carboxylic acid, carboxylic anhydride or carboxylic ester by a halogen-assisted reaction of a polyalkene and at least one olefinic monounsaturated mono- or di-carboxylic acid, anhydride or ester, said method comprising:

reacting polyalkene and at least one olefinic monounsaturated mono- or di-carboxylic acid, anhydride or ester in the presence of halogen and at least one metal compound, wherein said metal is selected from the group consisting of Mg, Ca, Ti, Zr, Hf, Cr, Mo, Mn, Fe, Co, Ni, Pd, Pt, Cu, Zn, Al and Sn; and said at least one metal compound is introduced into the reaction prior to a time at which greater than 85 mass % of said polyalkene has reacted with said olefinic monounsaturated mono- or di-carboxylic acid, anhydride or ester, in an amount introducing from about 0.01 to about 5 ppm by mass of elemental metal, based on the mass of polyalkene.

2. The method of claim 1, wherein said metal compound is introduced into the reaction pre-mixed with, or concurrent to the introduction of, said polyalkene.

3. The method of claim 2, wherein said metal compound is introduced into the reaction pre-mixed with said polyalkene.

4. The method of claim 1, wherein said at least one metal compound is introduced into the reaction in an amount introducing from about 0.1 to about 2 ppm by mass of elemental metal, based on the mass of polyalkene.

5. The method of claim 1, wherein said metal of said at least one metal compound is selected from the group consisting of Ti, Fe, Co, Ni, Cu, Zn and Al.

6. The method of claim 5, wherein said metal of said at least one metal compound is selected from the group consisting of Fe, Co and Cu.

7. The method of claim 6, wherein said metal of said at least one metal compound is Fe.

8. The method of claim 1, wherein said metal compound is a polyalkene-soluble metal compound.

9. The method of claim 5, wherein said metal compound is a polyalkene-soluble metal compound.

10. The method of claim 6, wherein said metal compound is a polyalkene-soluble metal compound.

11. The method of claim 7, wherein said metal compound is a polyalkene-soluble compound.

12. The method of claim 11, wherein said at least one polyalkene-soluble metal compound is selected from the group consisting of Fe naphthanate, neo-decanoate, Fe(III) 2 ethyl hexanoate, Fe(III) acetyl acetonate, Fe(II) stearate, and Fe(III) 2,4 pentanedionate.

13. The method of claim 1, wherein said polyalkene is polyisobutene, said olefinic, monounsaturated mono- or di-carboxylic acid, anhydride or ester is selected from the group consisting of fumaric acid, itaconic acid, maleic acid, maleic anhydride, chloromaleic acid, chloromaleic anhydride, acrylic acid, methacrylic acid, crotonic acid, cinnamic acid, and $C_1$ to $C_4$ alkyl acid esters thereof, and said halogen is chlorine or bromine.

14. The method of claim 13, wherein said polyalkene is polyisobutylene, said olefinic monounsaturated mono- or di-carboxylic acid, anhydride or ester is maleic anhydride and said halogen is chlorine.

15. The method of claim 14, wherein said polyisobutylene has a number average molecular weight ($\overline{M}_n$) of from about 900 to about 3000.

16. The method of claim 15, wherein said polyisobutylene has greater than about 60% tri- and tetra-substituted unsaturated end groups.

17. The method of claim 16, wherein said polyisobutylene is derived from a $C_4$ petroleum feed stream containing from about 10 to about 75 mass % of isobutene, based on the total mass of olefin.

18. The method of claim 1, wherein (A) said at least one olefinic monounsaturated mono- or di-carboxylic acid, anhydride or ester and (B) said polyalkene are charged for reaction in a molar ratio (A/B) of from about 0.9 to about 2.5.

19. The method of claim 18, wherein (C) said halogen is introduced into the reaction in a molar ratio (C/B) of from about 1.2 to about 3.5.

20. The method of claim 19, wherein said at least one olefinic monounsaturated mono- or di-carboxylic acid, anhydride or ester and said polyalkene are reacted together for from about 1 to about 15 hours, at a temperature of from about 100° C. to about 240° C.

21. The method of claim 20, wherein the temperature is raised during the reaction and introduction of said halogen begins at a temperature of from about 100° C. to about 170° C., and ends at a temperature of from about 180° C. to about 240° C.

22. The method of claim 21, wherein about 8 mass % to about 35 mass % of the total amount of halogen is introduced into the reaction per hour.

23. The method of claim 22, wherein at least 70 mass % of said halogen is introduced into the reaction before the reaction mixture reached 180° C.

24. The method of claim 23, wherein said polyalkene is polyisobutylene, said at least one olefinic, monounsaturated mono- or di-carboxylic acid, anhydride or ester is maleic anhydride and said halogen is chlorine.

25. The method of claim 24, wherein said metal compound is Fe(III) neodecanoate.

26. The method of claim 1, wherein said polyalkene-substituted carboxylic acid, carboxylic anhydride or carboxylic ester product has a functionality of from about 1.2 to about 1.7.

27. The method of claim 11, wherein said polyalkene and said at least one olefinic, monounsaturated mono- or di-carboxylic acid, anhydride or ester are reacted in the absence of elemental metal and polyalkene-insoluble metal compounds.

28. The method of claim 1, wherein said metal of said at least one metal compound is selected from Co, Sn, Ti, Zn, Ni and Cu.

29. The method of claim 28, wherein said metal of said at least one metal compound is selected from Ni and Cu.

30. The method of claim 29, wherein said metal compound is selected from polyalkene-soluble Ni and Cu compounds.

31. The method of claim 30, wherein said polyalkene-soluble Ni and Cu compounds are selected from the group consisting of Ni(II) 2-ethylhexanoate; Cu(II) 2-ethylhexanoate; and Cu(I) acetate.

* * * * *

UNITED STATES PATENT AND TRADEMARK OFFICE
CERTIFICATE OF CORRECTION

PATENT NO. : 7,662,887 B1 Page 1 of 1
APPLICATION NO. : 12/242971
DATED : February 16, 2010
INVENTOR(S) : Richard J. Severt et al.

It is certified that error appears in the above-identified patent and that said Letters Patent is hereby corrected as shown below:

In column 15, claim 12, line 3, after "Fe naphthanate," insert --Fe(III)--.

Signed and Sealed this

Thirteenth Day of April, 2010

David J. Kappos
*Director of the United States Patent and Trademark Office*